United States Patent [19]
Nezu et al.

[11] Patent Number: 5,960,915
[45] Date of Patent: Oct. 5, 1999

[54] HYDRAULIC SHOCK ABSORBER OF DAMPING FORCE ADJUSTING TYPE

[75] Inventors: Takashi Nezu, Tokyo; Akira Kashiwagi, Kanagawa-ken, both of Japan

[73] Assignee: Tokico, Ltd., Kanagawa-ken, Japan

[21] Appl. No.: 08/911,349

[22] Filed: Aug. 7, 1997

[30] Foreign Application Priority Data

Aug. 9, 1996 [JP] Japan .................................. 8-227505
Jul. 4, 1997 [JP] Japan .................................. 9-194935

[51] Int. Cl.⁶ ............................................. F16F 9/46
[52] U.S. Cl. .................................... 188/266.6; 188/322.2
[58] Field of Search ............................. 188/266.6, 266.5, 188/266.2, 266.1, 313, 318, 282.4, 282.3, 282.2, 286, 285, 287, 317, 322.13, 322.22, 315, 322.2

[56] References Cited

U.S. PATENT DOCUMENTS

| | | | |
|---|---|---|---|
| 5,439,085 | 8/1995 | Woessner ............................. | 188/266.6 |
| 5,518,089 | 5/1996 | Handka et al. ...................... | 188/266.6 |
| 5,651,433 | 7/1997 | Wirth et al ......................... | 188/266.6 |
| 5,655,633 | 8/1997 | Nakadata et al. .................... | 188/266.6 |

FOREIGN PATENT DOCUMENTS

| | | |
|---|---|---|
| 285 909 | 10/1988 | European Pat. Off. . |
| 35 44 474 A1 | 6/1987 | Germany . |
| 42 03 508 A1 | 8/1993 | Germany . |
| 5-332388 | 12/1993 | Japan . |

*Primary Examiner*—Douglas C. Butler
*Attorney, Agent, or Firm*—Wenderoth, Lind & Ponack, L.L.P.

[57] ABSTRACT

The present invention provides a hydraulic shock absorber in which a damping force can be changed nearly linearly as a valve body driven by a proportional solenoid is displaced, by utilizing ports and a oil groove which can easily be formed by a conventional machine tool such as a drilling machine or a lathe. Oil passages and an annular groove connected to the oil passages are formed in a surface of a cylindrical guide portion along which a plunger can slide, and, circular oil passages and an annular groove connected to and offset from the oil passages are formed in a surface of a plunger. The oil passages and annular groove in the plunger can easily be formed by a conventional machine tool such as a drilling machine or a lathe. When an oil path is opened, the oil passages are firstly opened and then the associated annular groove is opened. Thus, a damping force can be changed nearly linearly, and response to the switching of the damping force can be improved.

4 Claims, 6 Drawing Sheets

SMALL ←→ LARGE
FLOW-PASS AREA

Fig. 6

HYDRAULIC SHOCK ABSORBER OF DAMPING FORCE ADJUSTING TYPE

BACKGROUND OF THE INVENTION

The present invention relates to a hydraulic shock absorber of damping force adjusting type mounted to a suspension of a motor vehicle and the like.

Among hydraulic shock absorbers, there is a hydraulic shock absorber of damping force adjusting type in which a damping force can properly be adjusted to enhance riding comfort and steering stability in dependence upon a road condition and/or a running condition.

Generally, in the hydraulic shock absorber of damping force adjusting type, a cylinder containing oil therein is divided into two chambers by a piston slidably mounted within the cylinder and connected to a piston rod, and a main oil passage and a bypass passage are formed in the piston to communicate the two cylinder chambers with each other. The main oil passage is provided with a damping force generating mechanism comprised of an orifice and a disc valve, and the bypass passage is provided with a damping force adjusting valve for adjusting a flow area of the bypass passage. One of the cylinder chambers is connected, through a base valve, to a reservoir for compensating for changes in the volume of the cylinder (caused by extension and retraction of the piston rod) by compression and expansion of gas.

With this arrangement, when the bypass passage is opened by opening the damping force adjusting valve, oil flow resistance between two cylinder chambers is reduced to decrease the damping force, and, when the bypass passage is closed to increase the oil flow resistance between two cylinder chambers, the damping force is increased. In this way, the damping force can be properly adjusted.

Among the damping force adjusting hydraulic shock absorbers of this kind, there is a shock absorber of damping force adjusting type in which a valve body of the damping force adjusting valve is driven by a proportional solenoid to adjust the damping force in accordance with current applied to a coil of the solenoid. In this damping force adjusting hydraulic shock absorber, in order to make the entire absorber compact, generally, a plunger of the proportional solenoid serves as the valve body and a fixed iron core of the proportional solenoid serves as a valve seat member. The bypass passage is provided with two ports, one of which is formed in the valve body and the other of which is formed in the valve seat member for slidably guiding the valve body, so that, when the valve body is reciprocally shifted in accordance with the current applied to the coil of the proportional solenoid, the valve body is shifted relative to the valve seat member to adjust the oil flow resistance of the bypass passage formed by the ports, thereby adjusting the damping force properly.

In the above-mentioned conventional technique, there arose a problem that displacement of the valve body is not proportional to the change in the damping force correctly.

BRIEF SUMMARY OF THE INVENTION

To eliminate the above-mentioned conventional drawback, the present invention provides a hydraulic shock absorber of damping force adjusting type comprising a cylinder containing oil therein, a piston slidably mounted within the cylinder, a piston rod having one end connected to the piston and the other end extending out of the cylinder, an oil passage through which the oil flows in response to sliding movement of the piston, a damping force adjusting valve provided in the oil passage and adapted to change a flow area of the oil passage to adjust a damping force, and a proportional solenoid for driving the damping force adjusting valve, and wherein the damping force adjusting valve comprises a valve body driven by the proportional solenoid and a cylindrical valve seat member for slidingly guiding the valve body, and one of the valve seat member and the valve body has a circular port forming a part of the oil passage and an oil groove extending in a circumferential direction to partially overlap with an opening portion formed in a sliding surface including the circular port so that, when the oil passage is opened by the other of the valve seat member and the valve body, an arc portion of the circular port and the oil groove are opened in this order.

With this arrangement, when the flow area of the oil passage is changed to adjust the damping force, since the arc portion of the circular port and the oil groove are opened in this order, the damping force can be changed substantially in proportion to displacement of the valve body, unlike to the aforementioned conventional technique. Further, since the circular port and the oil groove are used, the damping force adjusting valve can easily be manufactured by using a conventional machine tool such as a drilling machine or a lathe.

DETAILED DESCRIPTION OF THE INVENTION

Figure 7:
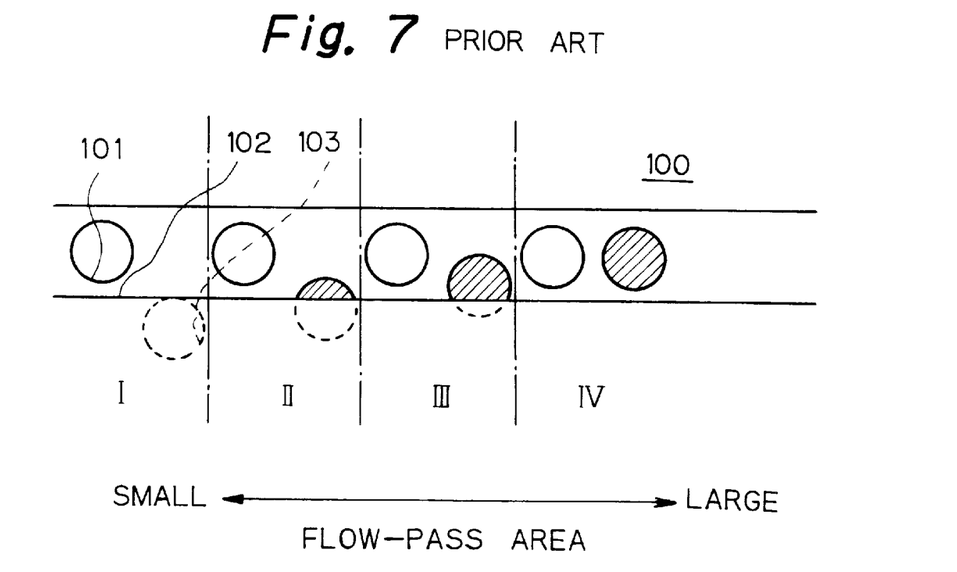
FIG. 7 is a view showing a flow area adjusted by relative movement between a plunger and a guide portion in a conventional technique.

Prior to detailed explanation of the present invention, opening/closing operations of ports provided in a valve body and a valve seat member in a conventional technique will be described with reference to FIG. 7.

A wall portion 100 of a valve seat member for slidably guiding a valve body of a proportional solenoid is provided with a plurality of ports 101 spaced apart from each other in a circumferential direction at a predetermined interval and extending radially through the wall portion, and a circumferential groove 102 is formed in the valve seat member (in the side facing the viewer in FIG. 7) in such a manner that the groove is completely overlapped with the ports 101. On the other hand, a wall of a valve body is provided with a plurality of ports 103 spaced apart from each other in a circumferential direction at a predetermined interval in a confronting relation to the circumferential groove 102 of the valve seat member. With this arrangement, a total flow area (hatched area in FIG. 7) of a bypass passage is changed as the ports 103 are moved relative to the circumferential groove 102 by reciprocal movement (displacement) of the valve body in response to current applied to a coil of the proportional solenoid, thereby reducing a damping force gradually. The ports and the circumferential groove are formed by using a conventional machine tool such as a drilling machine or a lathe.

Figure 4:
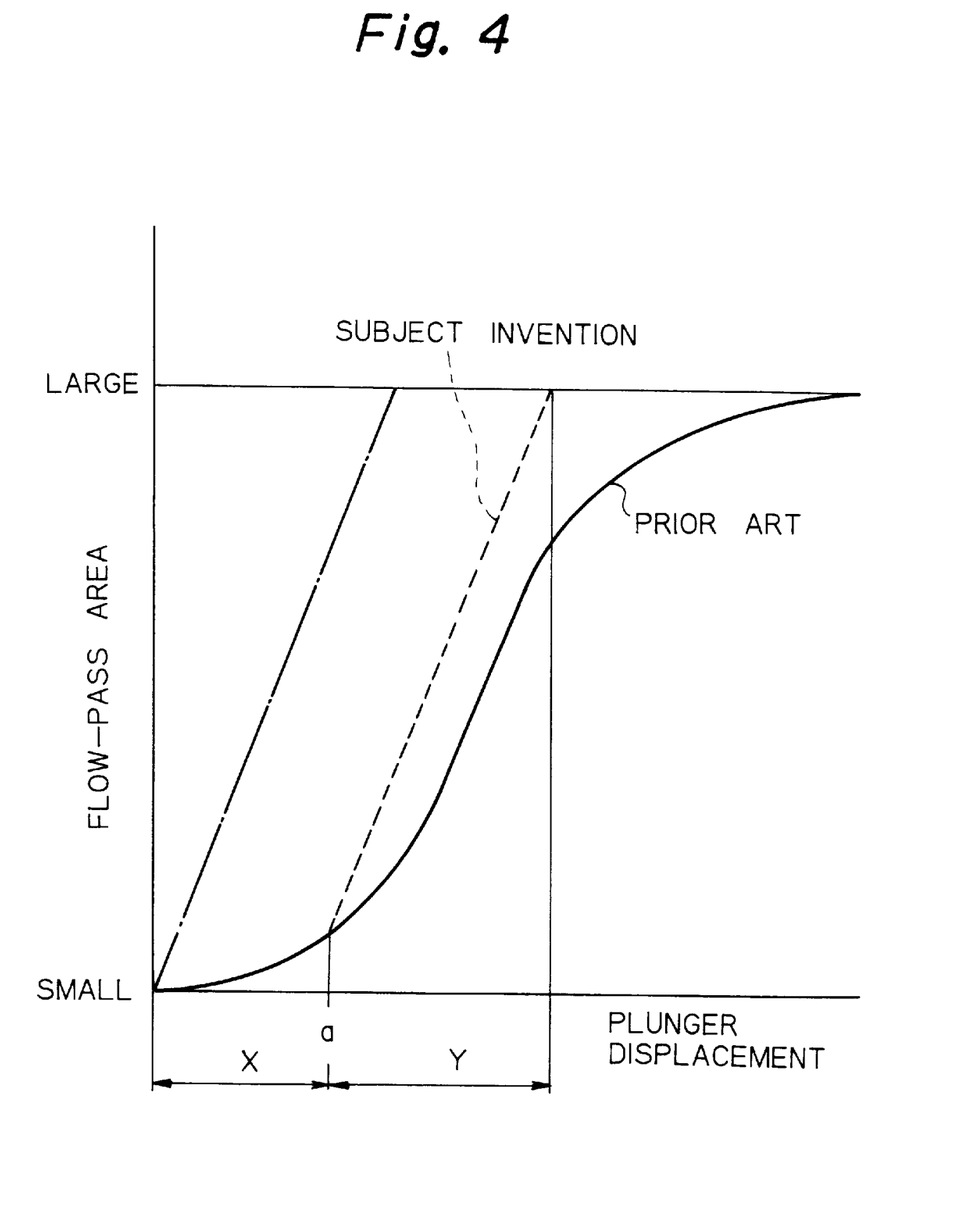
FIG. 4 is a graph showing a relation between displacement of the plunger and a flow area of an oil passage, in comparison with the present invention and a conventional technique.

However, in the above-mentioned conventional hydraulic shock absorber of damping force adjusting type using the proportional solenoid, there arises the following problems. For example, as shown by the solid line in FIG. 4, when the damping force is changed from a hard condition (in which the flow area is small) to a soft condition (in which the flow area is great), the flow area is increased along a quadratic curve, and, after the valve body passes through an intermediate position (where just half portions of the second ports 103 are overlapped with the circumferential groove 102), the flow area is decreased along a quadratic curve. The reason is that the ports 103 are circular.

Figure 5:
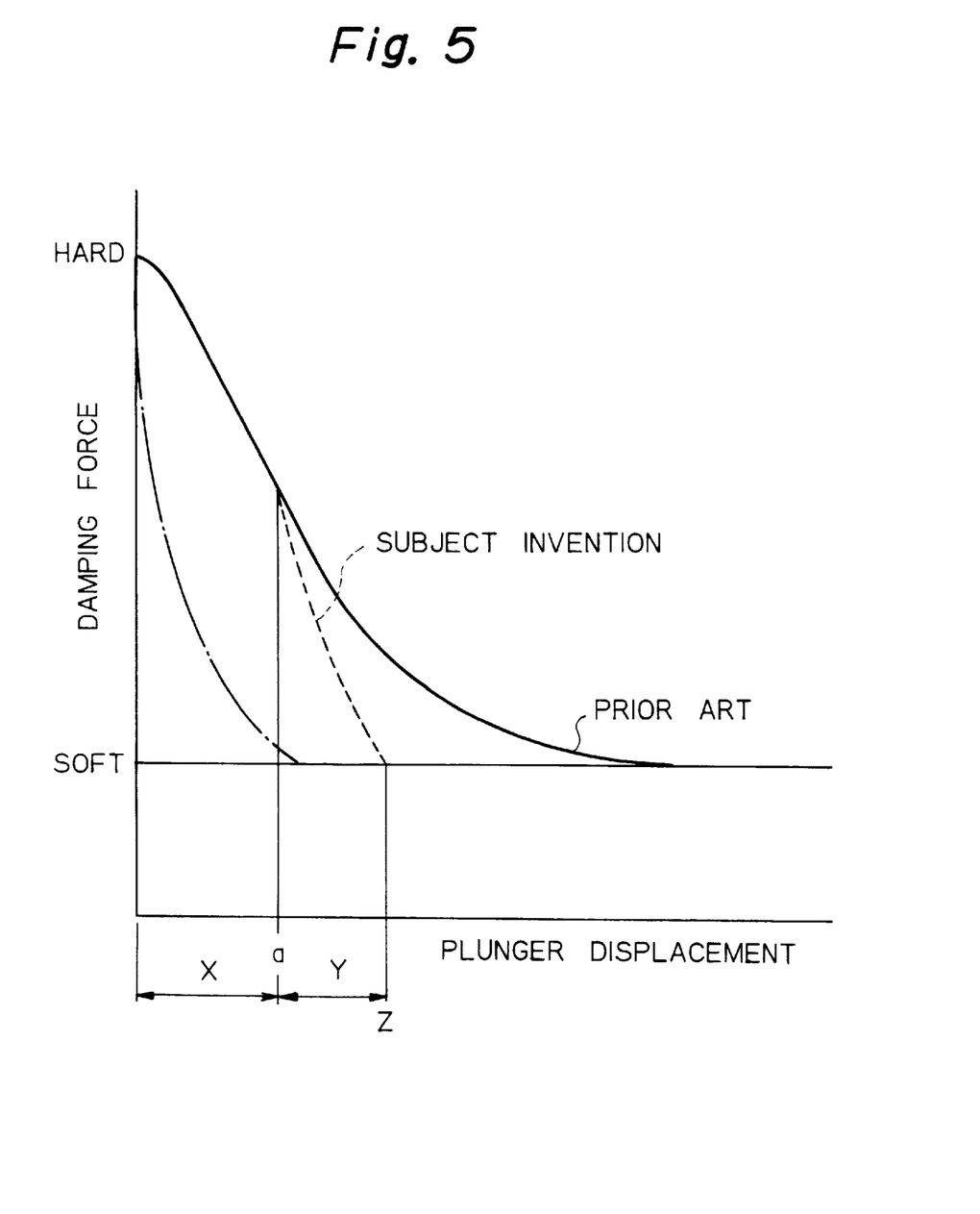
FIG. 5 is a graph showing a relation between displacement of the plunger and a damping force, in comparison with the present invention and a conventional technique.

Since the damping force is in inverse proportion to the square of the flow area, a relation between the displacement of the valve body and the damping force becomes as shown by the solid line in FIG. 5. That is to say, at the hard side, although the damping force is changed along a curve as the valve body is displaced, it can be regarded, macroscopically, that the damping force is changed along a straight line (linearly) with a rate of the change which is relatively great. On the other hand, at the soft side (right side from a position "a" in FIG. 5 after the valve body has been displaced by about one-third (⅓)), the damping force is changed along a quadratic curve as the valve body is displaced with a rate of the change which is considerably smaller.

Accordingly, the changes in the damping force in response to the same amount of current change are significantly different from each other at the hard and soft sides, i.e., before and after the valve body is displaced by about one-third, and the response to the switching of the damping force at the hard side greatly differs from that at the soft side (hence, in order to obtain the same change in the damping force, the valve body must be displaced greatly at the soft side in comparison with the hard side). In order to improve the response to the switching of the damping force, the current applied to the proportional solenoid (coil) may be varied before and after the valve body is displaced by about one-third for obtaining a desired rate of the change in the damping force. In this case, however, there arises a problem in that the control becomes complicated. When the damping force is changed from the soft side to the hard side (or vice versa) at once, since the change in the damping force is not constant in response to the displacement of the valve body, a bad influence sometimes affects the riding comfort. Since the valve body must be displaced greatly when the damping force is changed at the soft side, the entire shock absorber cannot be made compact.

In order to eliminate the fact that the rate of change in the damping force becomes very small at the soft side, for example, it is possible to provide another groove completely overlapped with the second ports and place this groove to be opposed to the aforementioned first circumferential groove. In this case, as shown by the dot and chain line in FIG. 4, the change in the flow area can be made constant (linear) as the valve body is displaced. However, as shown by the dot and chain line in FIG. 5, although the fact that the rate of change in the damping force becomes very small at the soft side can be eliminated, the rate of change in the damping force at the hard side becomes very great. Accordingly, even if the valve body is displaced minutely due to noise or vibration, the damping force is changed greatly at the hard side, and, in this case, there arises a problem that it is difficult to effect the control.

In order to solve the above problems, the damping force should be changed nearly linearly as the valve body is displaced. To this end, for example, Japanese Patent Laid-open No. 5-332388 discloses non-circular (wedge-shaped) second ports. In this case, however, since the ports are non-circular, it is hard to form or work the ports, and, thus, the ports cannot be formed by a conventional machine tool such as a drilling machine or lathe. As a result, the formation of ports becomes expensive, and working operability is worsened since a plurality of non-circular ports must be formed in the valve body.

The present invention aims to eliminate the above-mentioned conventional drawbacks, and an object of the present invention is to provide a hydraulic shock absorber in which ports and a groove can easily be formed by using a conventional machine tool such as a drilling machine or lathe, and a damping force can be changed nearly linearly as a valve body is displaced by a proportional solenoid by using such ports and groove. Another object is to provide such absorber as noted above which can be made compact.

Now, an embodiment of the present invention will be fully explained with reference to FIGS. 1 to 6.

Figure 1:
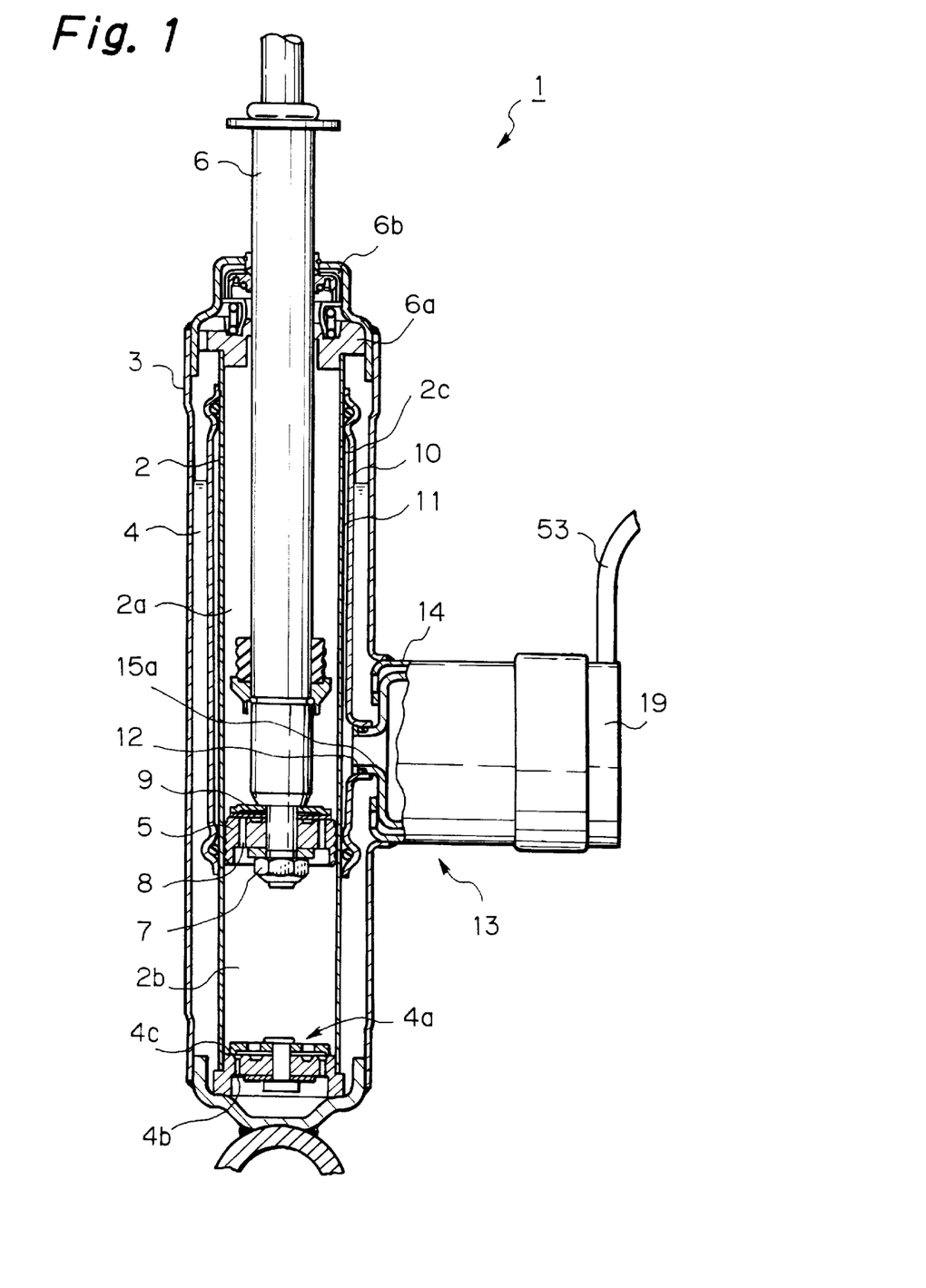
FIG. 1 is an elevational sectional view of a hydraulic shock absorber of damping force adjusting type according to an embodiment of the present invention.
Figure 2:
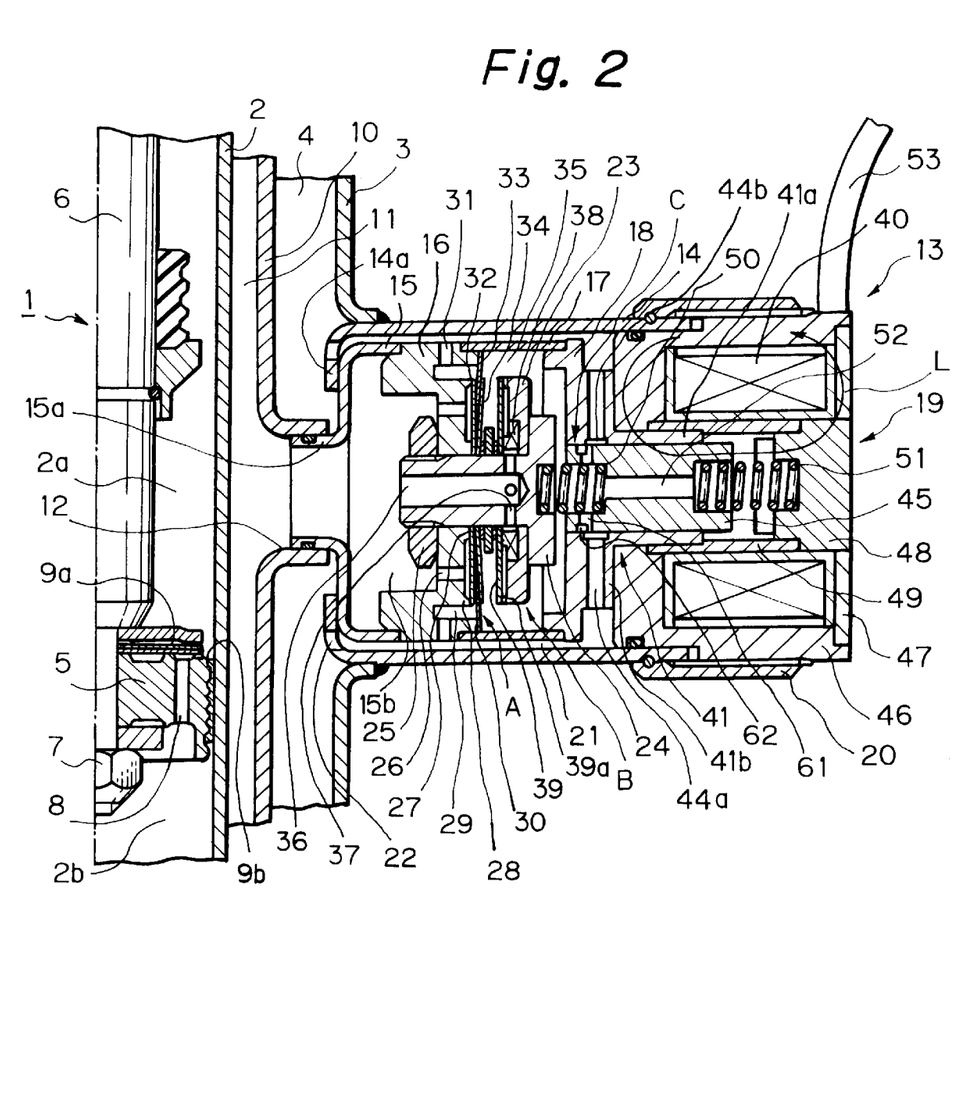
FIG. 2 is an enlarged sectional view of a main portion of the hydraulic chock absorber of damping force adjusting type of FIG. 1.

As shown in FIGS. 1 and 2, a hydraulic shock absorber 1 of damping force adjusting type has a dual cylinder structure having an inner cylinder 2 and an outer cylinder 3. A reservoir 4 is defined between the cylinders 2 and 3. A piston 5 is slidably mounted within the cylinder 2, which piston 2 divides the interior of the cylinder into an upper cylinder chamber 2a and a lower cylinder chamber 2b. A piston rod 6 has one end connected to the piston 5 via a nut 7 and the other end extending out of the cylinder 2 through the upper cylinder chamber 2a and a rod guide 6a and an oil seal 6b mounted in an upper end of the outer cylinder 3. A base valve 4a, disposed within a lower end portion of the cylinder 2, serves to isolate the lower cylinder chamber 2b from the reservoir 4 and is provided with oil passages 4b for communicating the lower cylinder chamber 2b with the reservoir 4 and a check valve 4c for permitting only oil flow from the reservoir 4 to the lower cylinder chamber 2b through the oil passages 4b. Oil (hydraulic fluid) is contained in the cylinder 2, and oil and gas are contained in the reservoir 4.

A plurality (only two are shown) of oil passages 8 are formed in the piston 5 along a circumferential direction and serve to communicate the upper cylinder chamber 2a with the lower cylinder chamber 2b. Further, the piston 5 is provided with a disc valve 9 which is closed for preventing oil flow from the upper cylinder chamber 2a to the lower cylinder chamber 2b through the oil passages 8 and is opened for permitting oil flow from the lower cylinder chamber 2b to the upper cylinder chamber 2a to generate a damping force in accordance with an opening degree of the disc valve. The disc valve 9 is constituted by laminated disc shaped valve bodies 9a disposed on an upper end surface of the piston 5. Orifices (notches) 9b for always communicating the upper cylinder chamber 2a with the lower cylinder chamber 2b through the oil passages 8 are formed in the valve body 9a.

A tube 10 is fitted on the cylinder 2 and an annular passage 11 is defined between the cylinder 2 and the tube 10. The annular passage 11 is communicated with the upper cylinder chamber 2a through an oil passage 2c formed in a side wall of the cylinder 2 at an upper end portion thereof. An opening portion 12 is formed in a side wall of the tube 10.

A damping force generating mechanism 13 is attached to a side of the outer cylinder 3. The damping force generating mechanism 13 is secured to the outer cylinder by welding an open end (having a bent portion 14a) of a cylindrical case 14 of the damping force generating mechanism to a side wall of the outer cylinder 3. Within the case 14, there are disposed a passage member 15, a valve body 16, a cylindrical member 17 and a guide member 18 which are arranged in this order from the bent portion 14a side and which abut against each other. A proportional solenoid body 19 is fitted into the other open end of the case 14 and is threadedly secured in a retainer 20. By letting the proportional solenoid body 19 abut against the guide member 18, the passage member 15, valve body 16, cylindrical member 17 and guide member 18 are positioned and fixed.

A small diameter opening portion 15a of the passage member 15 is fitted into the opening portion 12 of the tube 10 to communicate an oil chamber 15b of the passage member 15 with the annular passage 11. An annular oil passage 21 is defined between the passage member 15 and the cylindrical member 17 and the case 14, which annular oil passage 21 is communicated with the reservoir 4 through oil passages 22 formed in the bent portion 14a of the case 14. An annular auxiliary valve body 23 disposed within the cylindrical member 17 is secured to the valve body 16 by a pin 24 passing through a central opening of the auxiliary valve body 23 and a nut 25.

The valve body 16 is a substantially plate-shaped member and is provided with a plurality (only two are shown) of oil passages 26 disposed in a circumferential direction and extending in a radial direction. An annular inner seal portion 27 is protruded from one end of the valve body 16 and is disposed radially inwardly of the plurality of oil passages 26, and an annular valve seat 28 is protruded from the end of the valve body 16 and is disposed radially outwardly of the plurality of oil passages 26. An annular groove 29 is formed radially outwardly of the valve seat 28, and an annular outer seal portion 30 is protruded from one end of the valve body 16 and is disposed radially outwardly of the annular groove 29. An outer peripheral surface of the outer seal portion 30 abuts against an inner peripheral surface of the cylindrical member 17. The annular groove 29 is communicated with the annular oil passage 21 through oil passages 31.

The valve body 16 includes a disc valve 32 having an inner inside surface secured to the inner seal portion 27 and an outer inside surface seated against the valve seat 28. An inner inside surface of an annular seal disc 33 abuts against an outside surface of the disc valve 32 and an outer inside surface of the seal disc 33 abuts against the outer seal portion 30. An outer inside surface of a valve spring 34 comprised of laminated discs and having an inner peripheral surface secured to the pin 24 abuts against the seal disc 33, thereby urging the seal disc 33 and the disc valve 32 toward the outer seal portion 30. A pilot chamber 35 is defined within the cylinder member 17 by the disc valve 32 and the seal disc 33.

The valve body 16, disc valve 32, seal disc 33 and pilot chamber 35 constitute a main damping valve A of pilot type (referred to as "main damping valve A" herein after). The main damping valve A is opened when the disc valve 32 is subjected to pressure of oil from the oil passages 26, thereby generating a damping force depending upon such pressure. Valve opening pressure of the main damping valve A can be adjusted by pressure in the pilot chamber 35 (acting toward a direction for closing the main damping valve A).

The auxiliary valve body 23 is provided with an oil passage 38 for communicating the oil chamber 15b with the pilot chamber 35 through an oil passage 36 and fixed orifices 37 formed in the pin 24. The auxiliary valve body 23 includes a normally closed auxiliary disc valve 39 which is opened when it is subjected to pressure of oil in the oil passage 38 to generate a damping force depending upon such pressure. The auxiliary disc valve 39 is provided with orifices (notches) 39a for always communicating the oil passage with the pilot chamber 35. The auxiliary disc valve 39 and the orifices 39a constitute an auxiliary damping valve B.

The guide member 18 includes a cylindrical guide portion (valve seat member) 41 disposed in a confronting relation to a coil 40 of the proportional solenoid body 19 and adapted to slidingly guide a plunger (valve body) 45 which will be described later. The guide portion 41 comprises a small diameter cylindrical portion 41a disposed near the coil 40 and a large diameter cylindrical portion 41b disposed near the cylindrical member 17 and having oil passages 44a (described later). The large diameter cylindrical portion 41b of the guide portion 41 is provided with the above-mentioned oil passages 44a (only two are shown) disposed along a circumferential direction at a predetermined interval, and an annular groove 44b formed in an inner peripheral surface (along which the plunger 45 is slid) of the guide portion 41 and having a predetermined depth and completely overlapped with the oil passages 44a. The inner peripheral surface (along which the plunger 45 is slid) of the guide portion 41 is communicated with the annular oil passage 21 through the annular groove 44b.

Figure 3:
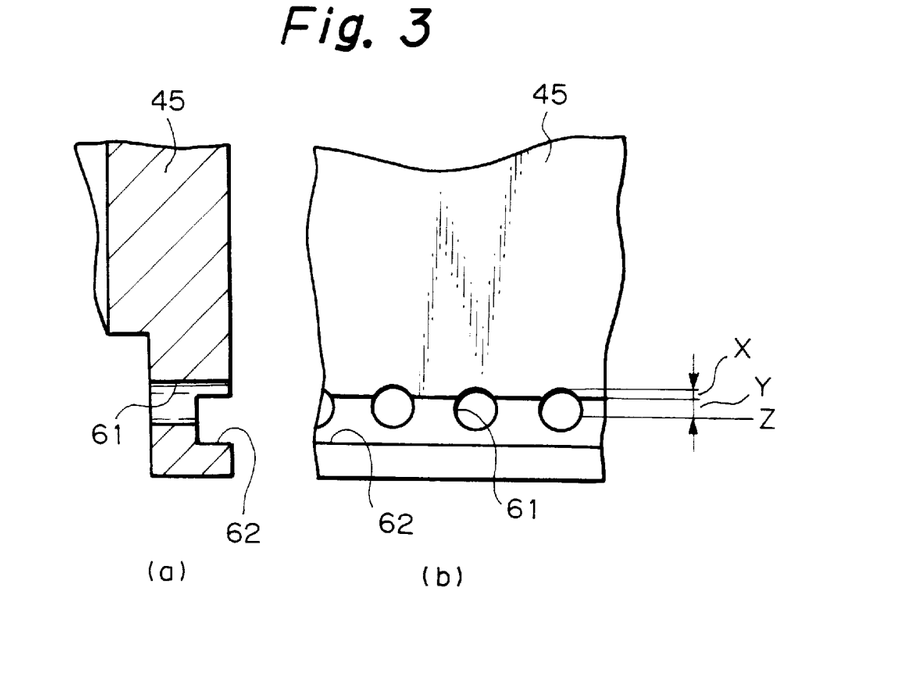
FIG. 3 is a view showing a plunger of the hydraulic shock absorber, where a section (a) is a partial sectional view of the plunger and a section (b) is an enlarged development partial view of the plunger.

The plunger 45 is slidably mounted within the guide portion 41. The guide portion 41 and the plunger 45 constitute a damping force adjusting valve. A section (b) in FIG. 3 is an development view of the plunger 45. A plurality of circular oil passages (circular ports) 61 disposed along a circumferential direction at a predetermined interval is formed in the plunger 45 in a confronting relation to the annular groove 44b of the guide portion 41, and an annular groove (oil groove) 62 having a predetermined depth and extending in a circumferential direction is formed in a surface of the plunger 45 facing the guide portion 41. The annular groove 62 is partially overlapped with the oil passages 61 in a plunger sliding direction (slightly offset from the oil passages 61 toward the pin 24).

The oil passage 2c, annular passage 11, small diameter opening portion 15a, oil chamber 15b, oil passage 36, fixed orifices 37, oil passage 38, orifices 39a, pilot chamber 35, oil passage 52, oil passages 61, annular groove 62, annular groove 44b, oil passages 44a, annular oil passage 21 and oil passages 22 constitute an oil path system.

The oil passages 44a and annular groove 44b of the guide portion 41 and the oil passages 61 and annular groove 62 of the plunger 45 constitute a variable orifice C, so that, when the plunger 45 is shifted relative to the guide portion 41, a flow area between the oil passages 44a/annular groove 44b and the oil passages 61/annular groove 62 is adjusted.

The coil 40 of the proportional solenoid 19 is housed in a cylindrical case 46 having a bottom, and the coil 40 is secured by an annular retainer 47 attached to an opening portion of the case 46. A plug 48 is inserted into a central opening of the retainer 47, and a cylindrical spacer 49 is disposed between the plug 48 and the bottom of the case 46. The small diameter cylindrical portion 41a of the guide portion is fitted into a central opening of the bottom of the case 46, and the plug 48 is opposed to one end of the plunger 45 slidably fitted into the guide portion 41.

A compression spring 51 is disposed between one end of the plunger 45 and the plug 48 and a compression spring 50 is disposed between the other end of the plunger 45 and the pin 24, so that the plunger 45 is biased toward the pin 24 (closed position) by spring forces of the compression springs 50, 51. The plunger 45 is provided with an axial through oil passage 52 which is communicated with the oil passages 44a and annular groove 44b through the oil passages 61 and annular groove 62. The oil passage 52 serves to connect between the oil chambers at both ends of the plunger 45 so that the plunger 45 can be slid within the guide portion 41 smoothly. Incidentally, in FIG. 2, the reference numeral 53 denotes a conductive wire through which the current is applied to the coil 40. When the current is applied to the coil 40 through the conductive wire 53, magnetic flux L is generated, with the result that the plunger 45 is attracted toward the plug 48 against the spring force of the compression spring 51. A flow area of the variable orifice C is adjusted in accordance with magnitude of the current applied to the coil 40.

Next, an operation of the shock absorber having the above-mentioned construction will now be described.

During the extension stroke of the piston rod 6, as the piston 5 is shifted, the disc valve 9 of the piston 5 is closed, with the result that the oil in the upper cylinder chamber 2a is pressurized, and the pressurized oil flows into the oil chamber 15b of the damping force generating mechanism 13 through the oil passage 2c, annular passage 11 and small diameter opening portion 15a and flows into the reservoir 4 through the oil passage 36, fixed orifices 37, oil passage 38, auxiliary damping valve B, pilot chamber 35, oil passage 52, oil passages 61, annular groove 62, annular groove 44b, oil passages 44a, annular oil passage 21 and oil passages 22. In this case, when the pressure in the upper cylinder chamber 2a reaches the valve opening pressure of the main damping valve A, the main damping valve A is opened, with the result that the oil flows from the oil chamber 15b into the oil passage 21 through the oil passages 26, annular groove 29 and oil passages 31. On the other hand, an amount of the oil corresponding to the shifting amount of the piston 5 flows from the reservoir 4 into the lower cylinder chamber 2b through the opened check valve 4c of the base valve 4a.

When a speed of the piston is small and before the main damping valve A is opened, the damping force is generated by the flow areas of the auxiliary damping valve B and variable orifice C. In this case, in the auxiliary damping valve B, before the disc valve 39 is opened, a damping force of orifice feature is generated by the orifice 39a, and, after the disc valve 39 is opened, the flow area is adjusted in accordance with the opening degree of the disc valve to generate a damping force of valve feature. In this way, before the main damping valve A is opened (i.e., in low speed and intermediate speed ranges of the piston), the proper damping force can be obtained.

When the piston speed is increased sufficiently to open the main damping valve A by the increased pressure in the upper cylinder chamber 2a, a damping force according to the increased pressure is generated. In this case, since the smaller the flow area of the variable orifice C the greater the pressure loss to increase the pressure in the upstream pilot chamber 35, the pilot pressure of the main damping valve A is increased. Since the pilot pressure acts toward the direction for closing the disc valve 32, the valve opening pressure for the main damping valve A is increased. Thus, by changing the flow area of the variable orifice C on the basis of the current applied to the coil 40, the orifice feature can directly be adjusted, and, by changing the pressure (pilot pressure) in the pilot chamber 35 to change the valve opening pressure for the main damping valve A, the valve feature can be adjusted. In this way, the adjusting range of the damping force feature can be widened.

On the other hand, during the compression stroke of the piston rod 6, as the piston 5 is shifted, the check valve 4c of the base valve 4a is closed, with the result that the oil in the lower cylinder chamber 2b flows into the upper cylinder chamber 2a while opening the disc valve 9 of the piston 5, and an amount of oil corresponding to the inserted portion of the piston rod 6 into the cylinder 2 flows from the upper cylinder chamber 2a into the reservoir 4 through the same oil flow path as that during the extension stroke.

Accordingly, similar to the extension stroke, when the piston speed is small and before the main damping valve A is opened, the damping force of orifice feature is generated by the flow areas of the auxiliary damping valve B and variable orifice C. When the piston speed is increased sufficiently to open the main damping valve A by the increased pressure in the upper cylinder chamber 2a, the damping force of valve feature according to the increased pressure is generated.

Since a pressure receiving area of the piston rod 6 during the compression stroke is smaller than a pressure receiving area during the extension stroke, the damping force during the compression stroke becomes smaller than the damping force during the extension stroke. If bubbles are generated in the cylinder 2, since a greater stroke is required to compress the bubbles, delay in generation of the damping force will occur accordingly. However, in the compression stroke, since the oil in the lower cylinder chamber 2b flows into the upper cylinder chamber 2a through the disc valve 9 of the piston 5, the damping forces of orifice feature and valve feature are added by the disc valve having the orifice 9b, with the result that the damping force in the compression stroke is increased and the delay in generation of the damping force is prevented.

Further, by changing the flow area of the variable orifice C on the basis of the current applied to the coil 40, the orifice feature can directly be adjusted, and, by changing the pressure in the pilot chamber 35, the valve feature can be adjusted. In this way, the damping force feature can be adjusted from the low speed range to high speed range of the piston.

In this way, the proper damping force from the low speed range to intermediate speed range of the piston can be obtained by the auxiliary damping valve B, and, the orifice and valve features at the extension and compression sides of the piston rod can be adjusted by adjusting the flow area of the variable orifice C. Thus, the proper damping force can be obtained through the entire range of the piston from the low speed range to high speed range. Since the main damping valve A and the auxiliary damping valve B are disposed in parallel, the valve opening feature of the auxiliary damping valve B can be set independently from the valve opening point of the main damping valve A. Therefore, a freedom of the setting of the damping force feature can be increased.

Next, the operation and damping force feature of the proportional solenoid will be fully described.

When the damping force is set hardest, the coil 40 is not energized, and the plunger 45 is positioned at the leftmost position in FIG. 2 by the spring forces of the compression springs disposed at both ends of the plunger 45. In this case, the oil passages 44*a* and annular groove 44*b* are closed by the side wall of the plunger 45. In this case, since the pressure in the pilot chamber 35 disposed at the upstream side of the variable orifice C is always communicated with the upstream side of the main damping valve A through the orifice 39*a*, the pressure in the pilot chamber 35 becomes substantially the same as the pressure in the upstream side of the main damping valve A, with the result that it is hard to open the main damping valve A. That is to say, the damping force is in the largest condition. From this condition, when the current applied to the coil 40 is increased to generate the magnetic flux L, the plunger 45 is attracted toward the plug 48 to be gradually shifted to the right in FIG. 2, with the result that arc portions of the oil passages 61 of the plunger 45 are opened to the annular groove 44*b* (oil passages 44*a*) (range X in FIGS. 3, 4 and 5). In this case, since the arc portions of the oil passages 61 are opened to the annular groove 44*b*, as shown by the solid line in FIG. 4, the flow area is slowly increased along the quadratic curve. As shown by the solid line in FIG. 5, although the damping force is changed along a curve in the initial phase after the oil passages 61 are opened, macroscopically, it is regarded that the damping force is gently changed substantially linearly. In this way, by opening the arc portions to the annular groove 44*b* (oil passages 44*a*), such a situation is prevented that when the plunger 45 is displaced minutely due to noise or vibration, the rate of increase of the flow area with respect to the displacement of the plunger 45 is great thereby providing great change in the damping force.

Thereafter, when the current applied to the coil 40 is increased to generate the magnetic flux L, since the attraction force is also increased, the plunger 45 is gradually displaced to the right in FIG. 2. As a result, the annular groove 62 is opened to the annular groove 44*b* (range Y in FIGS. 3, 4 and 5). In this case, as shown by the broken line in FIG. 4, the flow area is changed linearly, and, greatly with respect to the displacement amount of the plunger 45. On the other hand, although the damping force is in inverse proportion to the square of the flow area, since the flow area is relatively great and is changed greatly with respect to the displacement amount of the plunger 45, the damping force is changed along a curve which is nearly a straight line, and, greatly with respect to the displacement amount of the plunger 45 as shown by the broken line in FIG. 5.

When the plunger 45 is further displaced to the right in FIG. 2 to maximize the flow area (position Z in FIGS. 3, 4 and 5 where the flow area is equal to the total areas of the oil passages 61), the pressure in the pilot chamber 35 at the upstream side of the variable orifice C becomes substantially the same as the pressure in the reservoir 4 at the downstream side of the variable orifice C, with the result that the main damping valve A can easily be opened (i.e., the damping force becomes softest).

In this way, since the arc portions of the oil passages (circular ports) 61 are firstly opened to the annular groove 44*b* and then the annular groove (oil groove) 62 is opened to the annular groove 44*b*, as the plunger (valve body) 45 is displaced, the damping force can gently be changed nearly linearly at the hard and soft sides (i.e., through the entire range). Thus, particularly in comparison with the prior art as shown in the solid line in FIG. 5 where after the plunger 45 has passed through the position "a" (i.e., at the soft side) the change in the damping force with respect to the displacement of the plunger 45 is extremely small, the damping force can be changed as shown by the broken line, thereby improving the response to the switching of the damping force.

In the illustrated embodiment, since the combination of the circular oil passages 44*a*, circular oil passages 61, annular groove 44*b* and annular groove 62 which can easily be formed by using a conventional machine tool such as a drilling machine or a lathe is utilized, the shock absorber can be manufactured easily and cheaply.

In the illustrated embodiment, while an example is explained in which the annular groove 44*b* is formed in the surface of the guide portion (valve seat member) 41 along which the plunger 45 is slid in such a manner that the annular groove 44*b* is completely overlapped with the oil passages 44*a* of the guide portion, and, the annular groove 62 is formed on the sliding surface of the plunger 45 in a partial overlapping relation to the oil passages (circular ports) 61 of the plunger 45 so that when the oil path is opened the arc portions of the circular ports 61 and the annular groove 62 are opened in this order by the guide portion (valve seat member) 41, the present invention is not limited to such an example, but, alternatively, the annular groove 62 may be formed in the sliding surface of the plunger (valve body) 45 in such a manner that the annular groove is completely overlapped with the oil passages 61 and the annular groove (oil groove) 44*b* may be formed in the surface of the guide portion (valve seat member) 41 along which the plunger 45 is slid in a partial overlapping relation to the oil passages (circular ports) 44*a* of the guide portion so that when the oil path is opened the arc portions of the circular ports 44*a* and the annular groove 44*b* are opened in this order by the plunger (valve body) 45.

Figure 6:
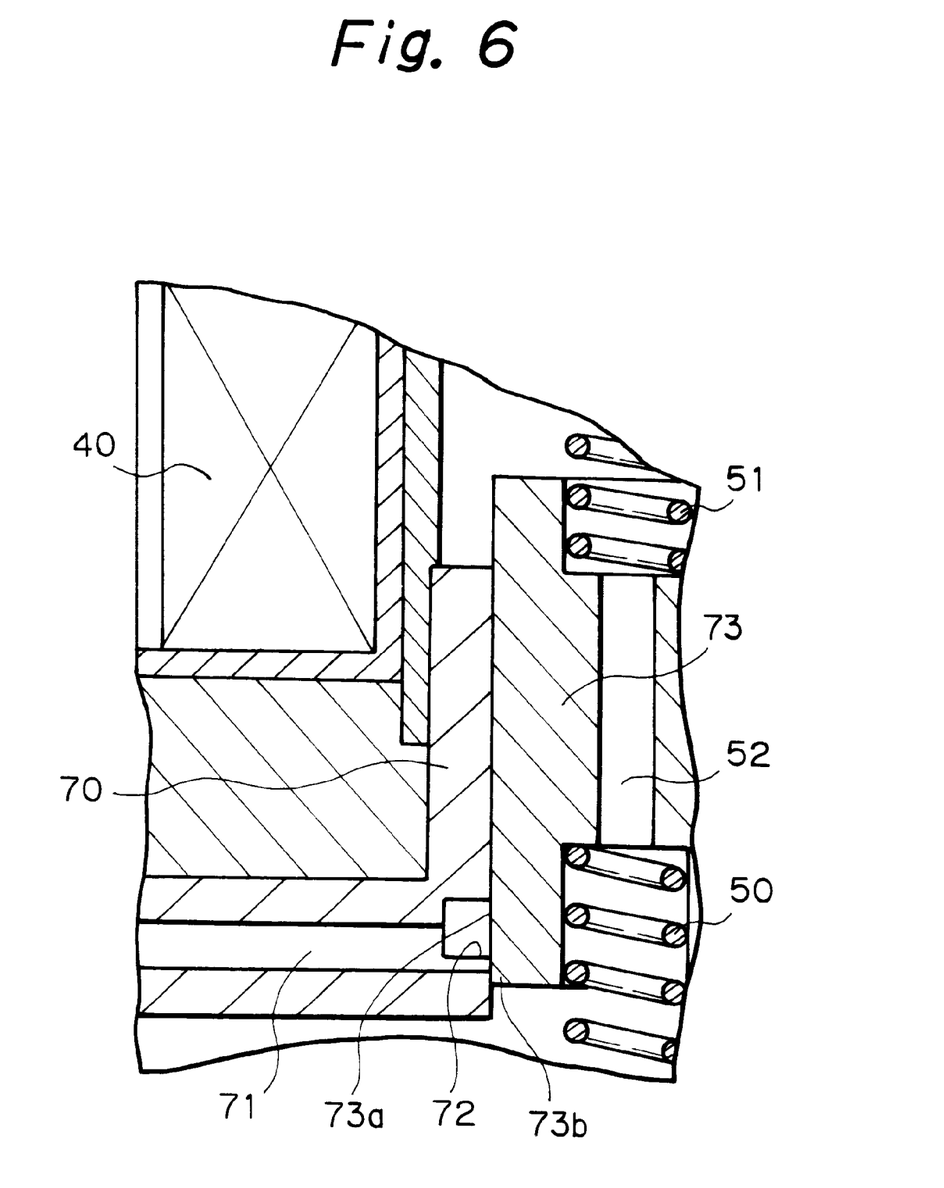
FIG. 6 is an enlarged sectional partial view showing a guide portion and a plunger according to another embodiment of the present invention.

In the illustrated embodiment, while an example that the circular ports and the annular groove are formed in both the guide portion (valve seat member) and the plunger (valve body) is explained, the present invention is not limited to such an example, but, for example, as shown in FIG. 6, oil passages (circular ports) 71 and an annular groove (oil groove) 72 may be formed in a guide portion 70 in such a manner that the annular groove 72 is partially overlapped with the oil passages 71, and, oil passages and an annular groove may be omitted from a plunger 73 as shown. That is to say, when the plunger 73 is positioned at a lower position as shown, the oil passages 71 and annular groove 72 of the guide portion 70 are closed by a wall portion 73*a* of the plunger 73 (in this case, the damping force becomes hardest), and, when the plunger 73 is displaced upwardly in FIG. 6, a lower edge portion 73*b* of the plunger 73 firstly opens the arc portion of the oil passages 71 and then opens the annular groove 72. In this case, since the circular ports and annular groove can be omitted from the plunger (valve body), the manufacture of the plunger can be facilitated and an axial dimension of the plunger can be reduced, thereby making the shock absorber more compact.

In the illustrated embodiment, while an example that the annular grooves (oil grooves) continuous in the circumferential direction are formed in the guide portion (valve seat member) and the plunger (valve body) is explained, the present invention is not limited to, such an example, the annular groove may be formed intermittently along the circumferential direction by using a milling machine which is one of the conventional machine tools. In this case, when a plurality of plungers having intermittent circumferential grooves of different circumferential size are prepared, only by exchanging the plungers, the rate of change in the damping force with respect to the displacement of the plunger can easily be altered, thereby increasing the degree of freedom regarding the design (setting) of the proportional solenoid.

In the illustrated embodiment, while an example that the ports (corresponding to the oil passages 44a in the illustrated embodiment) completely overlapped with the annular groove are circular is explained, in the present invention, the shape of the ports completely overlapped with the annular groove is not limited to the circle. Any shape can be used.

When the size of the portions (arc portions) of the circular ports which are not overlapped with the annular groove is selected to be equal or less than R/2 (R is a diameter of the circular port), an excellent result can be obtained. Desirably, such size is selected to be equal or less than about R/4.

In the illustrated embodiment, while the hydraulic shock absorber of damping force adjusting type for adjusting the damping force by adjusting the pilot pressure is explained, the present invention is not limited to such an shock absorber, but, the present invention may be applied to a standard hydraulic shock absorbers of damping force adjusting type in which a damping force is adjusted by adjusting a flow area of a passage (oil passage) communicating between upper and lower cylinder chambers.

As mentioned above, according to the present invention, since the circular ports and the circumferential oil groove are formed in one of the valve seat member and the valve body in a partial overlapping relation to each other so that, when the oil path is opened by the other of the valve seat member and the valve body, the arc portions of the circular ports and the oil groove are successively opened in this order, the damping force can be changed nearly linearly with respect to the displacement of the valve body, and the response to the switching of the damping force at the soft side can be improved. Thus, since the damping force can swiftly be changed in response to the input from the road surface, riding comfort and steering stability can be improved. Since the combination of the circular ports and the oil groove which can easily be formed by a conventional machine tool such as a drilling machine or a lathe is utilized, the shock absorber can easily be manufactured and the manufacturing cost can be reduced. Further, since the displacement amount of the valve body is small in comparison with the range of change in the damping force, the shock absorber can be made more compact and can easily be mounted on small-sized motor vehicles.

What is claimed is:

1. A hydraulic shock absorber of damping force adjusting type comprising:

a cylinder containing hydraulic fluid therein, a piston slidably received in said cylinder, a piston rod having one end connected to said piston and the other end extending out of said cylinder, a fluid passage through which the hydraulic fluid flows in response to sliding movement of said piston, a damping force adjusting valve provided in said fluid passage and adapted to change a flow-pass area of said fluid passage to adjust a damping force, and a proportional solenoid for driving said damping force adjusting valve, wherein said damping force adjusting valve comprises a valve body driven by said proportional solenoid and a cylindrical valve seat member for slidably guiding said valve body, and one of said valve seat member and said valve body has a circular port forming a part of said fluid passage and an oil groove extending in a circumferential direction to partially overlap with an opening end of the circular port and formed in a sliding surface including said circular port so that, when said fluid passage is opened by the other of said valve seat member and said valve body, an arc portion of said circular port and said oil groove are successively opened in this order.

2. A hydraulic shock absorber according to claim 1 further comprising a main damping force generating valve having a disc valve member in said fluid passage and a pilot chamber for retaining said hydraulic fluid so that the pressure of the fluid in the pilot chamber adjusts the valve-opening pressure of said disc valve member and wherein said damping force adjusting valve also adjusts the fluid pressure in said pilot chamber.

3. A hydraulic shock absorber according to claim 2, wherein said fluid passage comprises a main passage portion in which said main damping force generating valve is provided and a bypass passage portion parallel with said main passage portion, said bypass passage portion having a fixed orifice and wherein said pilot chamber is formed between said fixed orifice and said damping force adjusting valve.

4. A hydraulic shock absorber according to claim 3, wherein said piston has a passage extending therethrough so that a cylinder upper chamber defined above the piston and a cylinder lower chamber defined below the piston are communicated and a check valve allowing a fluid flow only from said cylinder lower chamber to said cylinder upper chamber, said fluid passage being connected to the cylinder so that in both extension and compression strokes of the piston rod, the hydraulic fluid flows in the direction from said fixed orifice to said damping force adjusting valve.

* * * * *

UNITED STATES PATENT AND TRADEMARK OFFICE
CERTIFICATE OF CORRECTION

PATENT NO. : 5,960,915
DATED : October 5, 1999
INVENTOR(S) : Takashi Nezu, et. al.

It is certified that error appears in the above-identified patent and that said Letters Patent is hereby corrected as shown below:

On the title page in item [73] change "Tokico, Ltd." to --Tokico Ltd.--

Signed and Sealed this

Third Day of October, 2000

Attest:

Q. TODD DICKINSON

*Attesting Officer*  *Director of Patents and Trademarks*